(12) United States Patent
Yamauchi et al.

(10) Patent No.: US 10,474,337 B2
(45) Date of Patent: Nov. 12, 2019

(54) VEHICULAR INFORMATION DISPLAY APPARATUS

(71) Applicant: DENSO CORPORATION, Kariya, Aichi (JP)

(72) Inventors: Hideaki Yamauchi, Kariya (JP); Mikio Kato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 144 days.

(21) Appl. No.: 15/516,308

(22) PCT Filed: Oct. 13, 2015

(86) PCT No.: PCT/JP2015/005173
§ 371 (c)(1),
(2) Date: Mar. 31, 2017

(87) PCT Pub. No.: WO2016/063493
PCT Pub. Date: Apr. 28, 2016

(65) Prior Publication Data
US 2017/0315709 A1 Nov. 2, 2017

(30) Foreign Application Priority Data
Oct. 22, 2014 (JP) .................................. 2014-215340

(51) Int. Cl.
*G06F 17/00* (2019.01)
*G06F 3/0484* (2013.01)
*B60K 35/00* (2006.01)

(52) U.S. Cl.
CPC .......... *G06F 3/04845* (2013.01); *B60K 35/00* (2013.01); *G06F 3/0484* (2013.01);
(Continued)

(58) Field of Classification Search
CPC ...... B60K 2350/1076; B60K 2350/352; B60K 35/00; B60K 2370/186; B60K 2370/171;
(Continued)

(56) References Cited

U.S. PATENT DOCUMENTS 8,674,820 B2 * 3/2014 Hofmann ............... B60K 35/00
340/438
9,701,199 B2 * 7/2017 Miuchi .............. B62D 15/0295
(Continued)

FOREIGN PATENT DOCUMENTS

| JP | H08285630 A | 11/1996 |
| JP | H10164433 A | 6/1998 |

(Continued)

*Primary Examiner* — William L Bashore
*Assistant Examiner* — David Faber
(74) *Attorney, Agent, or Firm* — Harness, Dickey & Pierce, P.L.C.

(57) ABSTRACT

A vehicular information display apparatus is provided which includes a display apparatus provided in a vehicle compartment and a display controller for controlling display of the display apparatus and is arranged to display specific information about a vehicle in a form to include a graphic on a screen of the display apparatus. The vehicular information display apparatus switches between a first display mode in which the specific information is displayed on a display region in the screen of the display apparatus and a second display mode in which the specific information is displayed on a display region smaller than the first display mode in the screen of the display apparatus. The display controller displays the graphic of the specific information by changing an orientation or a shape of the graphic when the display region is changed.

18 Claims, 3 Drawing Sheets

(52) U.S. Cl.
CPC .... *B60K 2370/152* (2019.05); *B60K 2370/16* (2019.05); *B60K 2370/171* (2019.05); *B60K 2370/186* (2019.05); *B60K 2370/52* (2019.05); *G06F 2203/04803* (2013.01)

(58) Field of Classification Search
CPC ............ B60K 2370/16; B60K 2370/52; B60L 2250/16; G06F 3/04845; G06F 3/0484
See application file for complete search history.

(56) References Cited

U.S. PATENT DOCUMENTS

| | | | | |
|---|---|---|---|---|
| 2001/0013902 A1* | 8/2001 | Kawabe | ............... | H04N 5/2628 348/240.3 |
| 2005/0168330 A1* | 8/2005 | Ono | ................. | B60K 35/00 340/461 |
| 2008/0150709 A1* | 6/2008 | Yamamoto | ............ | B60K 35/00 340/441 |
| 2009/0015395 A1* | 1/2009 | Rahe | ................. | B60K 35/00 340/461 |
| 2009/0174538 A1* | 7/2009 | Shibata | .................. | B60K 6/48 340/438 |
| 2010/0057281 A1* | 3/2010 | Lawyer | ............... | G07C 5/0825 701/22 |
| 2010/0162171 A1* | 6/2010 | Felt | ................... | H04M 1/27455 715/835 |
| 2010/0265050 A1* | 10/2010 | Skaff | .................... | B60K 6/448 340/438 |
| 2010/0305795 A1* | 12/2010 | Kuang | ................. | B60K 35/00 701/22 |
| 2010/0321176 A1* | 12/2010 | Hofmann | ............... | B60K 35/00 340/438 |
| 2011/0192666 A1* | 8/2011 | Schmid | ................... | B60K 6/28 180/165 |
| 2012/0056889 A1* | 3/2012 | Carter | ..................... | G06T 13/00 345/473 |
| 2012/0293509 A1* | 11/2012 | Barnsley | ................. | G06T 9/00 345/419 |
| 2013/0278404 A1* | 10/2013 | Choi | ...................... | B60K 37/02 340/438 |
| 2014/0129092 A1 | 5/2014 | Mori et al. | | |
| 2016/0280068 A1* | 9/2016 | Oku | ...................... | B60R 11/02 |

FOREIGN PATENT DOCUMENTS

| | | | |
|---|---|---|---|
| JP | 2010134596 A | * | 6/2010 |
| JP | 2012-056436 A | | 3/2012 |
| JP | 2014-091440 A | | 5/2014 |
| JP | 2015-020498 A | | 2/2015 |
| JP | 2015020498 A | * | 2/2015 |

* cited by examiner

VEHICULAR INFORMATION DISPLAY APPARATUS

CROSS-REFERENCE TO RELATED APPLICATIONS

This application is a U.S. National Phase Application under 35 U.S.C. 371 of International Application No. PCT/JP2015/005173 filed on Oct. 13, 2015 and published in Japanese as WO 2016/063493 A1 on Apr. 28, 2016. This application is based on and claims the benefit of priority from Japanese Patent Application No. 2014-215340 filed on Oct. 22, 2014. The entire disclosures of all of the above applications are incorporated herein by reference.

TECHNICAL FIELD

The present disclosure relates to a vehicular information display apparatus that includes a display apparatus provided in a vehicle compartment and a display controller to control display of the display apparatus, and that displays specific information about a vehicle on a screen of the display apparatus in a form to include a graphic.

BACKGROUND ART

A recent display apparatus uses a display screen divided into multiple segments and displays different images on the segments. For example, patent literature 1 discloses a technology in which one display screen of a television set includes a main screen corresponding to one large segment and sub-screens corresponding to multiple small segments and images corresponding to multiple different channels are displayed on the multiple sub-screens. The technology is configured so that the main screen displays an image of one selected channel and this image is reduced and is displayed on one segment of the sub-screen.

PRIOR ART LITERATURES

Patent Literature

Patent Literature 1: JP H10-164433 A

SUMMARY OF INVENTION

A display apparatus mounted on a vehicle displays a navigation screen-view indicating a subject vehicle position on a map and various information screen-views and these screen-views are divided when displayed. For example, a hybrid car including an engine and a motor as a driving source uses a display apparatus to display an energy flow screen-view (see FIG. 2) that indicates an exchange (flow) of energy among various parts (such as a battery, a motor, and an engine) of the driving source of the vehicle. The energy flow screen-view displays a flow of energy using an arrow (movie) overlapped with a graphic (transparent view) representing a vehicle body.

The energy flow screen-view may be displayed in a single screen-view display mode or a dual screen-view display mode. The single screen-view display mode displays the energy flow screen-view on the entire screen of the display apparatus. The dual screen-view display mode vertically (or horizontally) divides the display apparatus screen-view into two portions and displays the navigation screen-view on one portion and the energy flow screen-view on the other portion. However, the dual screen-view display mode narrows a display region (area) (and also changes the shape). Simply reducing the energy flow screen-view in the single screen-view display mode tends to hinder a user from viewing a displayed content and recognizing the information.

It is an object of the present disclosure to provide a vehicular information display apparatus that, when displaying the information about a vehicle in multiple modes using different display region sizes, enables a user to easily view information displayed in a small region.

A vehicular information display apparatus in an example of the present disclosure comprises: a display apparatus provided in a vehicle compartment; a display controller that controls display of the display apparatus, wherein the vehicular information display apparatus displays specific information about a vehicle in a form to include a graphic on a screen of the display apparatus (2) and further comprises: a display mode changer that switches between a first display mode and a second display mode, the first display mode being configured to display the specific information on a relatively large display region in the screen of the display apparatus and the second display mode being configured to display the specific information on a display region smaller than the first display mode in the screen of the display apparatus. The display controller displays the graphic of the specific information by changing an orientation or a shape of the graphic when the display mode changer changes the display region.

According to this vehicular information display apparatus, the first display mode can display specific information about a vehicle including a graphic on a relatively large display region and can provide display easily viewable for a user. In contrast, the second display mode, when changed by the display mode changer, displays specific information on a small display region in a screen of the display apparatus. The specific information is displayed while the display controller changes the orientation or the shape of a graphic representing the specific information. The display is more easily viewable for a user than simply reducing the graphic.

BRIEF DESCRIPTION OF DRAWINGS

The foregoing and other objects, features, and advantages of the present disclosure will become more apparent from the detailed description given below with reference to the accompanying drawings. In the drawings.

EMBODIMENTS FOR CARRYING OUT INVENTION

Figure 1:
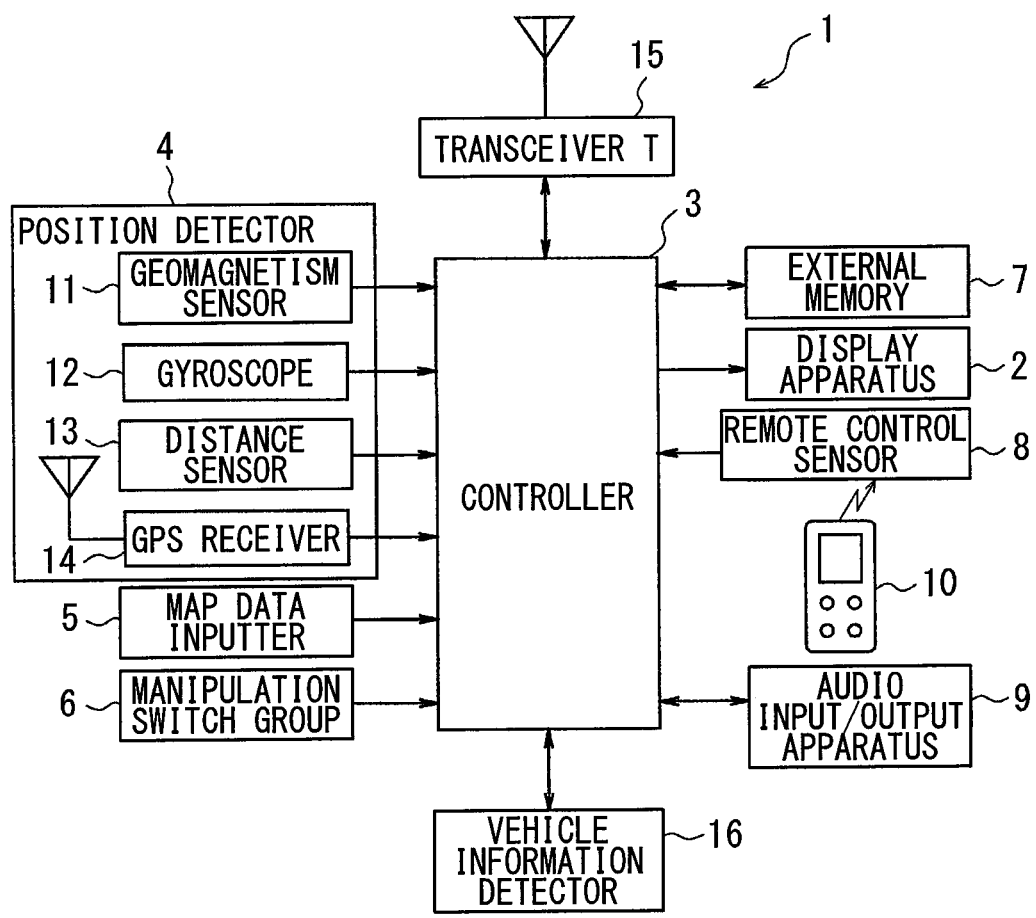
FIG. 1 is a functional block diagram schematically illustrating an electric configuration of an automobile navigation system according to an embodiment.

An embodiment will be described with reference to the accompanying drawings. As illustrated in FIG. 1, a car navigation system 1 according to the present embodiment is mounted on a vehicle (hybrid car) and includes a vehicular information display apparatus in this working example in such a manner that a display apparatus 2 placed in a vehicle compartment and a controller 3 to control the entire system are provided so as to be shared.

Though not illustrated in detail, the hybrid car as a vehicle includes a gasoline-driven engine and a battery-driven traveling motor each as a power source to rotatively drive wheels. The hybrid car also includes an engine ECU (Electronic Control Unit) to control the engine, a motor generator ECU (Electronic Control Unit) to control the traveling motor, and an HV control computer to selectively use the power source based on signals from various sensors and the ECU depending on traveling conditions. Moreover, the hybrid car includes the car navigation system 1 and also includes onboard instruments such as a car air-conditioner and a car audio.

Figure 2:
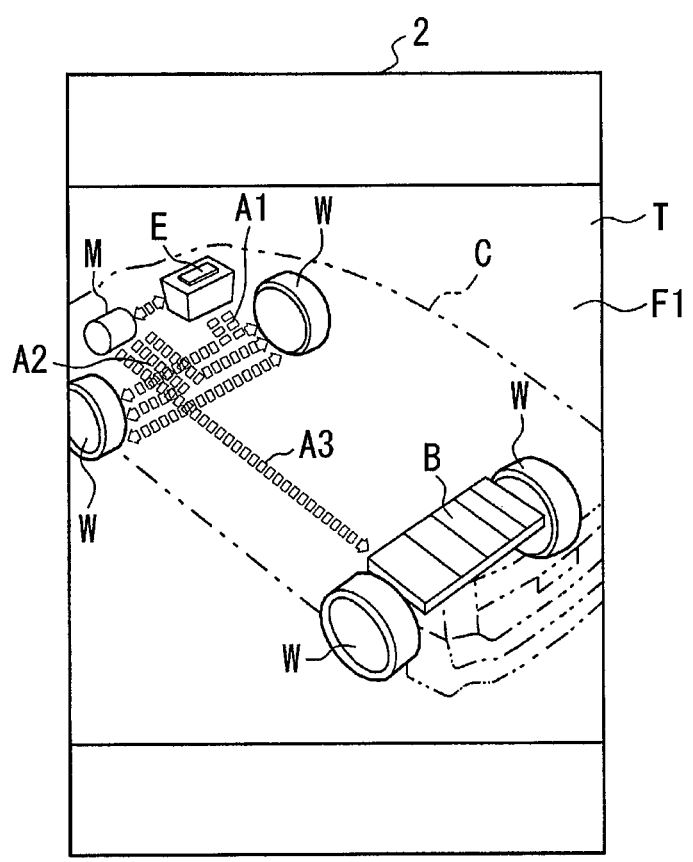
FIG. 2 illustrates an energy flow screen-view displayed on a display apparatus using a full screen-view.
Figure 3:
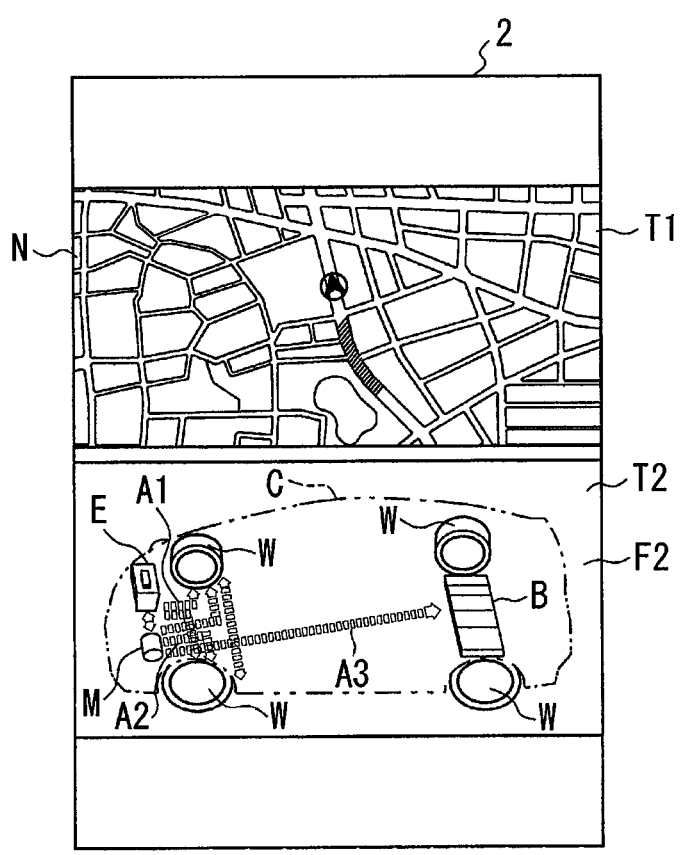
FIG. 3 illustrates an energy flow screen-view displayed on a display apparatus using a dual screen-view.

FIG. 1 schematically illustrates an electric configuration of the car navigation system 1 including the vehicular information display apparatus according to the working example. The display apparatus 2 uses a full-color liquid crystal display, for example, and is placed at the center of an instrument panel, for example. As illustrated in FIGS. 2 and 3, the display apparatus 2 uses an elongated-shape screen. The screen displays an energy flow screen-view or a navigation screen-view to be described later. The controller 3 is mainly configured as a computer including a CPU, ROM, RAM, I/O, and a bus line connecting these with each other. As will be described later, the controller 3 performs various processes such as a navigation process and functions as a display controller (display control means) that controls display on the display apparatus 2.

The controller 3 connects with a map data inputter 5 to input map data, a manipulation switch group 6, external memory 7 such as a hard disk apparatus, the display apparatus 2, a remote control sensor 8, and an audio input/output apparatus 9. The position detector 4 functions as a subject vehicle position detector (subject vehicle position detection means) that detects a position of the subject vehicle. The remote control sensor 8 receives a signal from a remote control terminal 10.

The position detector 4 includes publicly known components such as a geomagnetism sensor 11, a gyroscope 12, a distance sensor 13, and a GPS receiver 14 for GPS (Global Positioning System) for detecting (measures) positions of the subject vehicle based on radio waves transmitted from GPS artificial satellites. The controller 3 highly accurately detects a current position (absolute position), a traveling direction, a speed, a mileage, and the current time concerning the subject vehicle based on inputs from the sensors 11 through 14 included in the position detector 4. Depending on the accuracy, the position detector 4 may include part of the above-mentioned configuration and may use a rotation sensor for steering and a wheel sensor for each wheel.

The map data inputter 5 inputs so-called map matching data to improve position detection accuracy and various data including map data and mark data. A medium is generally provided as DVD-ROM (or CD-ROM) in consideration of the amount of data but may also be provided as a hard disk, a memory card, or an SD card. The controller 3 can allow the screen of the display apparatus 2 to display navigation screen-view N (see FIG. 3) that overlaps the current vehicle position detected by the position detector 4, map data input from the map data inputter 5, and additional data such as a guidance route.

The map data includes a road network that uses lines to represent roads on the map all over Japan. The map data is supplied as link data that is divided into multiple portions including nodes corresponding to intersections or branch points. A portion between nodes is defined as a link. The link data includes a link-specific link ID (identifier), a link length, position data (longitude and latitude) indicating the beginning and the end of a link, angle (direction) data, a road width, and a road type.

The manipulation switch group 6 includes a touch panel provided on the screen of the display apparatus 2 and mechanical switches provided around the display apparatus 2. The manipulation switch group 6 enables a user to perform various inputs or selections needed when specifying a destination. Manipulating the remote control terminal 10 can also specify a destination. The controller 3 executes a route search or guidance program, performs calculation to find a recommended route from a departure place (current place) to a destination specified by the user's manipulation on the manipulation switch group 6, and performs a route guidance function that provides guidance on the recommended route.

The above-mentioned route search uses the publicly known Dijkstra's algorithm, for example. The route search successively searches for a road (link) to an intersection (node) to be reached next, calculates its cost (evaluation value) from the departure place (current place) to the destination by using map data (link and node data) supplied from the map data inputter 5, and finds a connected route (a sequence of links) to the destination so as to satisfy a minimal cost. The route search may include road traffic information or weather information acquired from the outside by using the communication. As publicly known, the route guidance allows the screen of the display apparatus 2 to display a route to be traveled on the road map in a color different from other roads, for example, and allows an unshown audio output apparatus to output guidance audio when the current vehicle position reaches a specified point.

The controller 3 connects with a transceiver 15 for wireless communication with the outside to enable communication connection to the Internet or a dedicated information center. For example, the controller 3 can receive the most recent road traffic information (information about traffic congestion, accident, construction, lane regulation, and traffic regulation) supplied from a road traffic information center. The controller 3 can receive the most recent weather information (such as weather and direction of the wind) supplied from the meteorological agency.

The controller 3 connects with a vehicle information detector 16 via an in-vehicle LAN (unshown) such as CAN (Controller Area Network). The in-vehicle LAN connects with various ECUs. The vehicle information detector 16 is supplied with various types of information from the various ECUs related to travel control and inputs the supplied information to the controller 3. The various types of information include information needed for the controller 3 to generate energy flow screen-views F1 and F2 to be described later.

As above, the controller 3 allows the screen of the display apparatus 2 to display the energy flow screen-views F1 and F2 in a form to include graphics. The energy flow screen-views F1 and F2 each represent specific information about the vehicle, namely, a flow of energy among a motor, a battery, and an engine serving as parts of power sources for the vehicle. The graphic here generally includes an object shape and a pattern drawn by using lines and colors. The graphic also includes an animation (movie), a photo, and a character. As illustrated in FIGS. 2 and 3, the energy flow screen-views F1 and F2 display a graphic three-dimensionally representing outer shape C of a vehicle body, graphics representing four wheels W positioned at four locations of the vehicle body, graphics each schematically representing engine E, traveling motor M, and battery B, and three types of arrows A1, A2, and A3.

Though a detailed drawing is omitted, arrow A1 represents that engine E drives two wheels (front wheels). Arrow A1 is hidden (not displayed) when only traveling motor M drives wheel W (EV driving). Arrow A2 represents that traveling motor M drives two wheels (front wheels). Arrow A2 is hidden (not displayed) when only engine E drives wheel W (gasoline driving). Arrow A3 represents that engine E rotates a power generator to charge battery B. Arrow A3 is hidden (not displayed) during EV driving. Arrows A1 through A3 are displayed as animated so as to help understand the amount or the flow direction of energy.

The present embodiment provides a first display mode in FIG. 2 and a second display mode in FIG. 3 when the controller 3 allows the display apparatus 2 to display the energy flow screen-views F1 and F2. The first display mode in FIG. 2 displays the energy flow screen-view F1 on a relatively large display region (substantially entire screen) T in the screen of the display apparatus 2. The second display mode in FIG. 3 divides the screen of the display apparatus 2 substantially in half as vertically split display regions T1 and T2. The lower split display region T2 (part of the screen) displays the energy flow screen-view F2. The upper split display region T1 displays navigation screen-view N.

The controller 3 controls a change between the first display mode and the second display mode based on the user's manipulation on the manipulation switch group 6 or the audio input/output apparatus 9. According to the present embodiment, the controller 3 and the manipulation switch group 6 function as a display mode changer (display mode changeover means). The controller 3 activates the display by changing the orientation or the shape of a graphic included in the energy flow screen-views F1 and F2 when the display mode is changed to change the display region in the display apparatus 2. Therefore, the controller 3 also functions as the display controller (display control means).

Specifically, the energy flow screen-view F1 in FIG. 2 three-dimensionally represents outer shape C of the vehicle body from a viewpoint diagonally backward left above the vehicle. The energy flow screen-view F1 displays the graphic of shape C so that the long axis direction (the front-back direction of the body) is diagonal with reference to the portrait screen (display region T) of the display apparatus 2. In contrast, the energy flow screen-view F1 in FIG. 3 three-dimensionally represents outer shape C of the vehicle body from a viewpoint at the left above the vehicle. The energy flow screen-view F1 displays the graphic of shape C so that the long axis direction (the front-back direction of the body) corresponds to the longer direction (to be sideways) with reference to the landscape split display region T2 corresponding to the lower part of the screen of the display apparatus 2.

According to the present embodiment, the area of display region T of the energy flow screen-view F1 in the first display mode is approximately half the size (area) of the lower split display region T2 to display the energy flow screen-view F2 in the second display mode. The reduction ratio is approximately 50%. The reduction ratio of a graphic representing shape C is approximately 70% when the energy flow screen-view F1 (the first display mode) is changed to the energy flow screen-view F2 (the second display mode). Increasing the reduction ratio of the display region size increases the reduction ratio of the graphic.

According to the present embodiment, the controller 3 animates the reduction of the screen when the display changes (to reduce the display) from the energy flow screen-view F1 in the first display mode to the energy flow screen-view F2 in the second display mode. The orientation and the shape (including the size) of a graphic gradually change when the energy flow screen-view F1 transitions to the energy flow screen-view F2.

Specifically, suppose the user touches a manipulation button (unshown) displayed at the upper part of display region T in the first display mode, for example. The map display (the split display region T1 in the second display mode) then slides to appear on the screen from a boundary at the upper part of display region T as if lowering a curtain. Sliding the map display reduces display region T (split display region T2) that is then pressed downward. The reduction operation gradually changes the orientation and the shape of the graphic to be displayed. To the contrary, enlarging the display region gradually can change (enlarge) the orientation and the shape (including the size) of a graphic when the energy flow screen-view F2 changes to the energy flow screen-view F1.

The description below explains function effects of the above-mentioned configuration. As above, the screen of the display apparatus 2 displays the energy flow screen-views F1 and F2 to represent specific information about the vehicle, namely, a flow of energy among a motor, a battery, and an engine serving as parts of power sources for the vehicle. The controller 3 provides the user with the easily viewable display in the first display mode by displaying the energy flow screen-view F1 on relatively large display region T (substantially full-screen) in the display apparatus 2.

The controller 3 changes the screen-view of the display apparatus 2 to the second display mode when the user changes the display mode by manipulating the manipulation switch group 6. The second display mode displays navigation screen-view N in the split display region T1 corresponding to approximately the upper half of the screen of the display apparatus 2. The second display mode displays the energy flow screen-view F2 in the split display region T2 corresponding to approximately the lower half thereof. The second display mode can simultaneously display different types of information by effectively using the screen of the display apparatus 2.

The second display mode displays the energy flow screen-view F2 on a display region in the screen of the display apparatus 2. This display region is smaller than that displayed in the first display mode. The present embodiment displays the energy flow screen-view F2 by changing the orientation and the shape of a graphic. The present embodiment can provide the user with the more easily viewable display even when the information (the energy flow screen-view F2) is displayed on the small region in the screen of the display apparatus 2 differently from simply reducing the energy flow screen-view F1.

The controller 3 animates the reduction of the screen (display region) and a change in the orientation and the shape of a graphic when the display changes from the energy flow screen-view F1 to the energy flow screen-view F2. This can allow the user to visually and easily understand that the graphic represented in the energy flow screen-view F1 is equal to the graphic represented in the energy flow screen-view F2.

According to the present embodiment, the energy flow screen-view F1 (the first display mode) changes to the energy flow screen-view F2 (the second display mode). In this case, display region T changes to the display region T2 to reduce the size (area) at the reduction ratio of approximately 50%. Shape C representing the vehicle body changes to reduce the graphic at the reduction ratio of approximately 70%. The reduction ratio of the graphic is larger than the reduction ratio of the display region size. A graphic included in the energy flow screen-view F2 can be displayed so as to be relatively large even when the small split display region T2 displays the energy flow screen-view F2 in the second display mode. The sufficiently easily viewable display is available for users.

The graphic (shape C of the vehicle body) includes the long axis and the short axis in the energy flow screen-views F1 and F2. The graphic orientation is changed so as to adjust to the landscape view (split display region T2) in the second display mode as the display mode changes. The graphic can be displayed to be relatively large in relation to the shapes of the display regions T and T2. The more easily viewable display is available for users. The graphic used three-dimensionally represents outer shape C of the vehicle body. The graphic is displayed by changing a rendering viewpoint as the display mode changes (to change the shapes of the display regions T and T2). There is also available an advantage of enabling the display of a visually improved graphic corresponding to the shapes of the display regions T and T2.

The above-mentioned embodiment has described the example of displaying the energy flow screen-views F1 and F2 that represent specific information about the vehicle, namely, a flow of energy among the motor, the battery, and the engine. However, the vehicular information display apparatus according to the present disclosure can be applied to display of various information about vehicles. According to the embodiment, the vehicular information display apparatus is included in (shared with) the car navigation system but may be configured as a standalone apparatus independent of the car navigation system. The vehicular information display apparatus according to the present disclosure can be mounted on not only hybrid cars, but also various vehicles such as a car using the internal combustion engine as a power source and an electric vehicle using the motor as a power source.

The screen of the display apparatus may be landscape as a whole. The display region may be horizontally divided into multiple portions or may be divided vertically and horizontally. Multiple display regions, if provided, may have irregular areas. The display mode may be changed automatically instead of the user manipulation. Three or more different display modes may be provided. The embodiment in the present disclosure is not limited to the above-mentioned but includes an embodiment resulting from appropriate modifications without departing from the spirit and scope of the present disclosure.

What is claimed is:

1. A vehicular information display apparatus comprising:
   a display apparatus provided in a vehicle compartment;
   a controller configured to control display of the display apparatus, wherein the vehicular information display apparatus is arranged to display specific information about a vehicle in a form to include a graphic on a screen of the display apparatus and further comprises:
   the controller is configured to switch between a first display mode and a second display mode, the first display mode being configured to display the specific information on a large display region in the screen of the display apparatus and the second display mode being configured to display the specific information on a small display region smaller than the first display mode in the screen of the display apparatus, wherein:
   the controller displays the graphic of the specific information by changing an orientation or a shape of the graphic when the controller changes the display region;
   where the graphic representing the specific information includes a long axis and a short axis, the controller changes the orientation of the graphic representing the specific information so that the long axis of the graphic conforms to a longer direction of the display region;
   the large display region is longer in a vertical direction than in a horizontal direction and the small display region is shorter in a vertical direction than the large display region;
   horizontal widths of the large display region and the small display region are equivalent;
   in the first display mode, the large display region displays a three-dimensional graphic representing an outer shape of a vehicle body; and
   in the second display mode, the small display region includes a first small display area displaying a navigation screen view and a second small display area displaying the three-dimensional graphic representing the outer shape of the vehicle body.

2. The vehicular information display apparatus according to claim 1, wherein:
   the controller displays the specific information by using less than the entire screen of the display apparatus in the first display mode and displays the specific information by using a part of the screen of the display apparatus in the second display mode.

3. The vehicular information display apparatus according to claim 1, wherein:
   when the first display mode changes to the second display mode, the controller changes display of the graphic so that a reduction ratio for the graphic is larger than a reduction ratio for size of the display region.

4. The vehicular information display apparatus according to claim 1, wherein
   when the display mode is changed, the controller animates display so that the graphic representing the specific information gradually changes in response to operation of enlarging and reducing the display region in the screen of the display apparatus.

5. The vehicular information display apparatus according to claim 1, wherein
   the large display region is divided in half vertically between an upper split small area and a lower split small area, the upper split small area is the first small display area and displays the navigation screen view and the lower split small area is the second small display area and displays the three-dimensional graphic representing the outer shape of the vehicle body.

6. The vehicle information display apparatus according to claim 5, wherein
   the navigation screen view slides to appear from an upper boundary of the second small display area.

7. A vehicular information display apparatus comprising:
   a display apparatus provided in a vehicle compartment;
   a controller configured to control display of the display apparatus, wherein the vehicular information display apparatus is arranged to display specific information about a vehicle in a form to include a graphic on a screen of the display apparatus and further comprises:
   the controller is configured to switch between a first display mode and a second display mode, the first display mode being configured to display the specific information on a large display region in the screen of the display apparatus and the second display mode being configured to display the specific information on a small display region smaller than the first display mode in the screen of the display apparatus, wherein:
the controller displays the graphic of the specific information by changing an orientation or a shape of the graphic when the controller changes the display region;
where the graphic representing the specific information is three-dimensional, the controller changes a rendering viewpoint depending on a shape of the display region;
the large display region is longer in a vertical direction than in a horizontal direction and the small display region is shorter in a vertical direction than the large display region;
horizontal widths of the large display region and the small display region are equivalent;
in the first display mode, the large display region displays a three-dimensional graphic representing an outer shape of a vehicle body; and
in the second display mode, the small display region includes a first small display area displaying a navigation screen view and a second small display area displaying the three-dimensional graphic representing the outer shape of the vehicle body.

8. The vehicular information display apparatus according to claim 7, wherein
the large display region is divided in half vertically between an upper split small area and a lower split small area, the upper split small area is the first small display area and displays the navigation screen view and the lower split small area is the second small display area and displays the three-dimensional graphic representing the outer shape of the vehicle body.

9. The vehicle information display apparatus according to claim 8, wherein
the navigation screen view slides to appear from an upper boundary of the second small display area.

10. The vehicular information display apparatus according to claim 7, wherein:
where the graphic representing the specific information includes a long axis and a short axis, the controller changes the orientation of the graphic representing the specific information so that the long axis of the graphic conforms to a longer direction of the display region.

11. A vehicular information display apparatus comprising:
a display apparatus provided in a vehicle compartment;
a controller configured to control display of the display apparatus,
wherein the vehicular information display apparatus is arranged to display specific information about a vehicle in a form to include a graphic on a screen of the display apparatus and the specific information about the vehicle includes the graphic representing outer shape of the vehicle body, the vehicular information display apparatus further comprising:
the controller is configured to switch between a first display mode and a second display mode, the first display mode being configured to display the specific information on a large display region in the screen of the display apparatus and the second display mode being configured to display the specific information on a small display region smaller than the first display mode in the screen of the display apparatus,
wherein: the controller displays the graphic of the specific information by changing an orientation or a shape of the graphic when the controller changes the display region;
the large display region is longer in a vertical direction than in a horizontal direction and the small display region is shorter in a vertical direction than the large display region;
horizontal widths of the large display region and the small display region are equivalent;
in the first display mode, the large display region displays a three-dimensional graphic representing an outer shape of a vehicle body; and
in the second display mode, the small display region includes a first small display area displaying a navigation screen view and a second small display area displaying the three-dimensional graphic representing the outer shape of the vehicle body.

12. The vehicular information display apparatus according to claim 11 wherein:
the controller displays the specific information by using less than the entire screen of the display apparatus in the first display mode and displays the specific information by using a part of the screen of the display apparatus in the second display mode.

13. The vehicular information display apparatus according to claim 11, wherein:
when the first display mode changes to the second display mode, the controller changes display of the graphic so that a reduction ratio for the graphic is larger than a reduction ratio for size of the display region.

14. The vehicular information display apparatus according to claim 11, wherein:
where the graphic of the specific information includes a long axis and a short axis, the controller changes the orientation of the graphic representing the specific information so that the long axis of the graphic conforms to a longer direction of the display region.

15. The vehicular information display apparatus according to claim 11, wherein
where the graphic representing the specific information is three-dimensional, the controller changes a rendering viewpoint depending on a shape of the display region.

16. The vehicular information display apparatus according to claim 11, wherein
when the display mode is changed, the controller animates display so that the graphic representing the specific information gradually changes in response to operation of enlarging and reducing the display region in the screen of the display apparatus.

17. The vehicular information display apparatus according to claim 7, wherein
the large display region is divided in half vertically between an upper split small area and a lower split small area, the upper split small area is the first small display area and displays the navigation screen view and the lower split small area is the second small display area and displays the three-dimensional graphic representing the outer shape of the vehicle body.

18. The vehicle information display apparatus according to claim 17, wherein
the navigation screen view slides to appear from an upper boundary of the second small display area.

* * * * *